Figure 1:
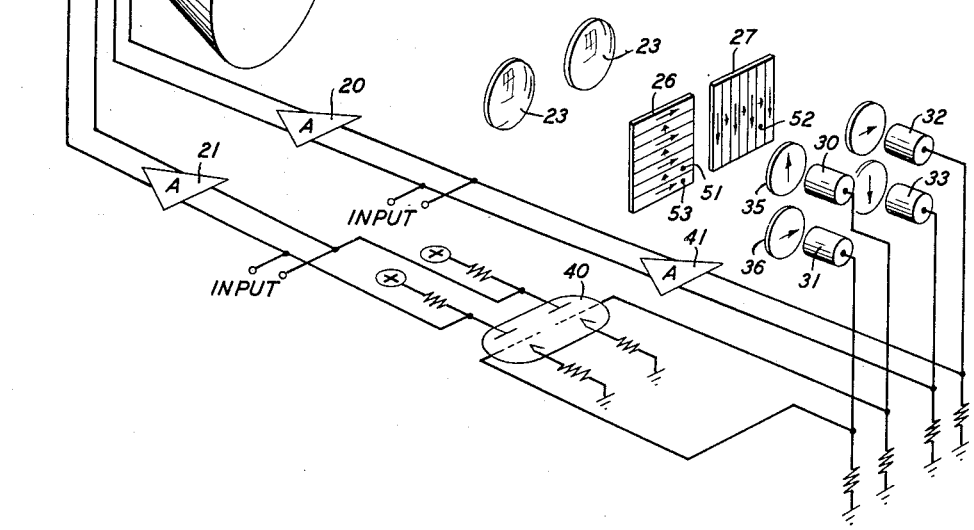

Sept. 8, 1959  C. W. HOOVER, JR  2,903,598

BEAM POSITIONING SYSTEM

Filed March 26, 1956

INVENTOR
C. W. HOOVER JR.
BY James W. Falk
ATTORNEY

United States Patent Office 2,903,598
Patented Sept. 8, 1959

2,903,598

BEAM POSITIONING SYSTEM

Charles W. Hoover, Jr., Summit, N.J., assignor to Bell Telephone Laboratories, Incorporated, New York, N.Y., a corporation of New York Application March 26, 1956, Serial No. 573,896

12 Claims. (Cl. 250—217)

This invention relates to beam positioning systems and more particularly to systems especially suitable for positioning of a beam produced in a cathode ray device.

For various applications utilizing cathode ray tubes, it is desirable to achieve a high speed positioning of the electron beam on a discrete target area, to assure the maintenance of this position or at least a coordinate of this position for a prescribed period of time and to reposition the beam to the desired position should it fail to strike it exactly in response to initial positioning means.

Such a positioning system lends itself to storage systems of the type disclosed in application Serial No. 541,195, filed October 18, 1955 by R. C. Davis and R. E. Staehler, now Patent 2,830,285, issued April 8, 1958. In a system as disclosed in the above application, information is stored on photographic plates in the form of transparent and opaque areas, each area representing a binary code bit of information. The storage plates are positioned in front of a cathode ray tube having a luminescent surface such that the electron beam, directed to a discrete area of the luminescent surface, forms a light beam which in turn is focused on one of the discrete areas of the storage plate. A light sensitive device behind the storage plate converts light passing through the storage plate into electrical signals and passes the signals to an output circuit. In order to attain the exacting requirements of beam positioning in such a system for rapid and precisely accurate positioning on any one of the discrete areas of the storage slide there may advantageously be employed a feedback positioning system which in the cited application included positioning slides comprising alternate opaque and nonopaque bands. By means of a feedback loop between a photosensitive device positioned behind each of these positioning slides and the cathode ray tube deflection plates, the beam could be made to fall on a boundary line between an opaque and a nonopaque band of each positioning slide, which position assures proper positioning of the beam on the desired discrete information storage area. The amount of light passing through a nonopaque band causes an electrical signal of proportionate size to be produced by the photocell. This signal is compared with a reference signal proportionate to the amount of light which should pass through the nonopaque band to position the beam on a borderline with an opaque band. The beam is repositioned by the feedback from the signal comparing means until the output signal and reference signal are at the same level.

I have found that variations in the size and intensity of the spot formed by the light beam impinging the storage and positioning slides are encountered in various beam positions. Thus the beam positioned in the central region of the cathode ray tube provides a smaller and more intense spot of light on the storage and positioning slides than when positioned in a region remote therefrom. Such beam variations may result in inaccuracies in the positioning feedback network in that the light output through the nonopaque bands of the positioning slides corresponding to the proper beam position varies with beam deflection, while the comparison signal is constant.

It is an object of this invention to provide an improved beam positioning system.

It is another object of this invention to provide a beam positioning system independent of variations in size and intensity of the projected beam.

These and other objects of the invention are attained in accordance with features of the invention by the employment of a plurality of slides facing the luminescent screen of a cathode ray tube. Optical means are provided therebetween to focus light emanating from the tube surface, due to the incident electron beam, simultaneously on a discrete area of the surface of each of the slides. Photosensitive devices are positioned so as to receive light passing through each slide and thereafter to convert it into electrical impulses. Feedback paths emanate from the photosensitive devices and connect through various circuit means to the input circuit of the cathode ray tube.

In accordance with one aspect of this invention, an optical feedback system is utilized wherein the electron beam position advantageously is monitored and the beam is driven to the exact location desired, thereby obviating the need for complex initial deflection circuitry, and the system may be provided with conventional deflection circuitry for initial deflection of the electron beam. Thus the light beam may be directed to the approximate desired location by the initial deflection circuitry at which point the beam will impinge a corresponding spot on each of the positioning slides. Light passing through the positioning slides activates photosensitive devices such as photomultiplier tubes, to transmit signals in a feedback circuit. If the beam is not positioned at the exact desired location, the signals in the feedback circuit will so indicate and will activate means to reposition the beam to the desired location.

One of the positioning slides is provided with horizontal bands of polarized or color filter material and another is provided with similar bands in a vertical direction. Adjacent bands on each positioning slide are arranged to pass light polarized in different directions if polarized material is employed, or to pass different levels of light if color filter material is employed. A pair of photosensitive devices is positioned behind each slide and is connected through a difference amplifier to the corresponding horizontal or vertical input address circuits of the cathode ray tube. One of each pair is fitted with a mask matching the composition of alternate bands of its corresponding positioning slide, so that only light through those bands will activate the photosensitive device. The other photosensitive device in the pair has its mask matching the composition of the adjacent alternate bands of the positioning slide. Comparisons are made by the difference amplifier for each coordinate between electrical signals received from each of the pair of photosensitive devices. If the signals agree in each coordinate feedback path, the beam is properly positioned on the dividing line between adjacent bands on each positioning slide. If they disagree in either coordinate feedback path, the beam is impinging one band more than the adjacent band of the positioning slide for that coordinate, thus producing a stronger signal through the former and a weaker signal through the latter. The comparison of these signals in the associated difference amplifier will produce a correcting signal which is fed to the deflection circuits and combined with the initial input signal so as to guide the beam to the proper position. The circuits are arranged so that the direction of correction is determined by the type of band on which the beam impinges; i.e., a majority of the light beam passing through bands of one type material will cause the beam to be driven in one direction and vice versa for the bands of the other type material, thus serving to drive the beam toward the dividing line between adjacent bands.

It is therefore a feature of this invention that a positioning system utilize a comparison of output signals from photosensitive devices arranged to receive light produced by the electron beam of a cathode ray tube impinging a luminescent screen to determine the accuracy of initial position and to reposition through a feedback network connected to the deflection plates of the cathode ray tube.

It is a more specific feature of this invention that the beam be focused by a multiple lens system simultaneously on a plurality of positioning slides having adjacent bands of unlike light transmission characteristics and having photosensitive devices arranged so as to receive light passing through certain of the bands, and to convert the light received into electrical signals.

It is another feature of this invention that a mask be positioned in front of each photosensitive device comprising light transmission characteristics such that light through one positioning slide band type will be passed to the photosensitive device and light through the adjacent band type will be blocked.

It is a more particular feature of this invention that a difference amplifier be included in the output paths of pairs of the photosensitive devices and the feedback signals from each pair of photosensitive devices be compared in a difference amplifier, the resultant being transmitted to the deflection plates of the cathode ray tube.

Figure 2:
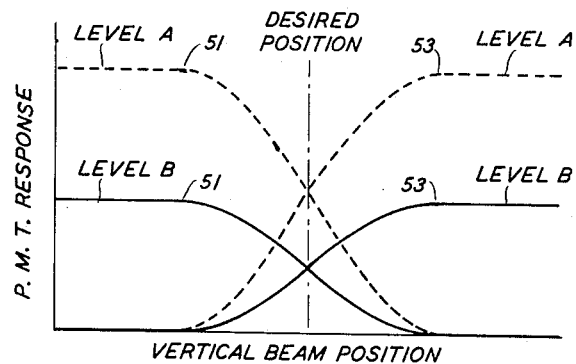

A complete understanding of this invention and of the above-noted and other features thereof may be gained from consideration of the following detailed description and the accompanying drawing in which:

Fig. 1 is a representation mainly in block form, of one specific illustrative embodiment of this invention; and Fig. 2 is a graphical representation of the response of illustrative photosensitive devices to various light levels of the beam utilized in this invention.

Referring now to the drawing, the specific illustrative embodiment of this invention there depicted, includes a cathode ray tube comprising an evacuated enclosing vessel 11 having at one end an electron gun 12. The electron gun 12 produces a concentrated electron beam which is projected centrally between two pairs of deflection plates 13 and 14, mounted in space quadrature. The electron beam is projected against a target surface 15 which forms the face of the cathode ray tube and is coated with a luminescent material or phosphor. The deflection plates 13 and 14, which are energized from horizontal and vertical deflection circuits through deflection amplifiers 20 and 21, respectively, serve to deflect the electron beam to a desired discrete area of surface 15. The deflection circuits providing input signals to amplifiers 20 and 21 may be of any of a number of circuits capable of converting binary information to analog representations, the binary information indicating the desired position in each coordinate. Amplifiers 20 and 21 supply output voltages to the deflection plates 13 and 14 representing a summation of analog values in each deflection circuit.

The electron beam is deflected in accordance with the voltages applied to the deflection plates 13 and 14 so that it impinges a discrete area of the surface 15 and produces a spot of light thereat. A lens system 23 is positioned behind surface 15 to focus the resultant light on slides 26 and 27, shown in this specific embodiment to illustrate the use of such slides to provide precise coordinate positioning of an electron beam to any of a plurality of discrete positions. Each of slides 26 and 27 provides precise positioning at various levels in one coordinate through employment of alternate strips of one characteristic with intermediate strips of another characteristic. Slide 26 designated the vertical address positioning slide, has the alternate strips arranged horizontally while slide 27, designated the horizontal address positioning slide, has the alternate strips arranged vertically. Adjacent strips advantageously may comprise different color filter materials or polarized materials with different directions of polarization on said slides. Adjacent strips of different characteristics are indicated in Fig. 1 by oppositely directed arrows.

A pair of photosensitive devices is positioned so as to receive light passing through a corresponding one of the positioning slides 26 and 27. Thus, the photosensitive devices 30 and 31 receive light through slide 26 and devices 32 and 33 receive light through slide 27. Masks such as 35 and 36 are inserted between each photosensitive device 30–33 and its corresponding slide 26 or 27, preventing light through slides 26 and 27 from directly impinging the faces of the photosensitive devices. One mask in each pair comprises a material having the same characteristic as alternate strips on the corresponding slide; the other mask in the pair having the characteristic of the strips adjacent the alternate strips on the corresponding slide. Thus, mask 35 may be polarized in the same direction as alternate strips on slide 26 and mask 36 may be polarized in the same direction as strips adjacent the alternate strips on slide 26. Light passing through the alternate strips of slide 26 will pass through mask 35 activating the photosensitive device 30. Mask 36 will block this light, but will pass light received through the adacent strips on slide 26. Thus, it can be seen that each photosensitive device 30–33 is activated by light passing through half of the strips on a corresponding slide 26 or 27.

The outputs of the pairs of photosensitive devices 30, 31 and 32, 33 are compared in difference amplifiers 40 and 41; the difference between the outputs of each of a pair such as 30 and 31 being registered as the output of the corresponding difference amplifier. This output from the difference amplifiers 40 and 41 is fed back to the deflection circuitry in the corresponding coordinate to reposition the electron beam.

Assume, for example, that the initial beam positioning circuitry caused the light beam to be focused on position 51 of slide 26 and position 52 of slide 27. Since position 51 is wholly within one of the strips on slide 26, only the photosensitive device 30, having a mask 35 with a characteristic corresponding to the strip in which the light beam impinges on the slide 26, will be activated to provide an output signal to the difference amplifier 40. Amplifier 40 responds to receipt of a maximum signal on one input and a zero signal on the other input by providing an output signal to the deflection circuitry serving to drive the beam in one direction toward the intersection of the alternate strip on which it first impinged and an adjacent strip. Since the beam has some finite width, an increasing portion of the beam will overlap the intersection and impinge on the adjacent strip prior to the center of the beam reaching the intersection. The overlapping portion activates the other photosensitive device 31 in the pair, but to a lesser extent than the activation of device 30 by light through the strip of first impingement. A comparison of the two signals thus will result in an output continuing to drive the beam in the same direction until one-half of the beam lies in the strip of first impingement and one-half in the adjacent strip. At this precise point the output of the difference amplifier is zero and the beam is locked to the intersection. An overshoot of the beam during positioning or input variations causing more than one-half of the beam to impinge the adjacent strip at point 53, for example, the resultant output signal from amplifier 40 will be such as to drive the beam in the opposite direction; i.e., back toward the intersection. The direction of drive is discretionary so long as the direction of drive from the alternate strips is opposite that from the adjacent strips. In this fashion the beam may be directed to any one of a plurality of intersections dependent upon the number of strips employed. Similarly, a second slide 27 and associated photosensitive devices 32 and 33 may be employed to direct the beam to any one of a plurality of intersections in the opposite coordinate. Thus the ultimate beam position may be defined by the point of intersection of the coordinate boundary line positions on each of positioning slides 26 and 27.

This positioning technique may be employed in a storage device such as disclosed in the application of Davis and Staehler noted hereinbefore. In such a device the beam is split by additional lenses and directed to slides storing binary information as well as to the positioning slides. Alternatively, separate tubes for positioning and storage may be empolyed with the deflection plates of each tied together. The technique described serves to position the beam accurately on any one of a plurality of discrete locations of the storage slides from which readout of information may be effected. The beam may then be scanned from such a starting point or address position to read additional information from the storage slide.

Since positioning of the beam must be precisely accurate at any deflection for successful operation of a storage system as described above, the positioning system must be entirely independent of local variations in beam size, intensity and distribution, which may occur due in part to variations in the phosphor output at various points on the cathode ray tube screen. Fig. 2 illustrates the achievement of this requirement by this invention. In order to reach a desired position it is required by this invention merely that one-half the light through a positioning slide be received by each of the pair of photosensitive devices positioned therebehind. Since one of the pair of photosensitive devices can receive light only through alternate strips on the slide and the other of the pair only through the strips adjacent the alternate strips, positioning on an intersection between adjacent strips is achieved only when the light inputs to the photosensitive devices are mirror images of one another. A light beam impinging position 51 or position 53 will be driven to the intersection between them despite variations in light intensity causing the beam to impinge on the photosensitive devices at levels A or B, Fig. 2.

The system is applicable also to use as a function generator in which case a positioning slide is employed comprising two areas of different light passing characteristics, the intersection of which constitutes the function to be generated. The beam is locked to the intersection in the same manner as described hereinbefore, and a sweep signal is applied to the horizontal deflection plates, deflection in the vertical direction being controlled by the feedback positioning action of the system. As the beam is swept across the slide the required function is generated and the representative voltage can be obtained from the output of the amplifier driving the vertical deflection plates.

Again this invention, being independent of local variations in the phosphor output for different beam positions and other factors influencing spot size, intensity and distribution, assures that the beam will be locked at all times to the function to be generated thereby providing a precisely accurate representation of the function.

It is to be understood that the above-described arrangements are illustrative of the application of the principles of the invention. Numerous other arrangements may be devised by those skilled in the art without departing from the spirit and scope of the invention.

What is claimed is:

1. A positioning system comprising a light beam source, means for determining the position of said source, and means for correcting the position of said source, said correcting means including positioning means fixed in space and comprising a plurality of first and second regions, a first light responsive means for generating electrical signals in response to light transmitted thereto from said source through one of said first regions of said positioning means, a second light responsive means for generating electrical signals in response to light transmitted thereto through one of said second regions of said positioning means, means for comparing said electrical signals from each of said light responsive devices and means for applying correction signals to said determining means dependent on the resultant of said comparison of electrical signals.

2. A positioning system in accordance with claim 1 and further comprising means positioned between said positioning means and said first light responsive means and arranged to pass light received through one of said first regions of said positioning means to said first light responsive means and other means positioned between said positioning means and said second light responsive means and arranged to pass light received through one of said second regions to said second light responsive means.

3. A positioning system in accordance with claim 2 wherein each of said first regions of said positioning means bears light transmission characteristics distinct from each of said second regions and each of said means positioned between said positioning means and said light responsive means bears light transmission characteristics equivalent to a corresponding one of said first and second regions.

4. A positioning system in accordance with claim 3 wherein each of said first and second regions comprises polarized material having a distinct direction of polarization.

5. A positioning system in accordance with claim 3 wherein each of said first and second regions comprises filter material capable of transmitting light contained in a distinct wavelength band.

6. An electrical circuit comprising an electron discharge device having a luminescent surface, means for projecting an electron beam against said surface, means for deflecting said beam and means for correcting the deflection of said beam, said correcting means including a positioning slide fixed in space and comprising a plurality of first and second regions of distinct light transmission characteristics, a first light responsive means for generating electrical signals in response to light transmitted thereto from said surface through one of said first positioning slide regions, a second light responsive means for generating electrical signals in response to light transmitted thereto from said surface through one of said second positioning slide regions, means for comparing said electrical signals from each of said light responsive means, and means for applying correction signals to said deflection means dependent on the resultant of said comparison of electrical signals.

7. An electrical circuit in accordance with claim 6 and further comprising means positioned between said slide and said first light responsive means and arranged to pass light received through said first distinct slide regions to said first light responsive means, and other means positioned between said slide and said second light responsive means and arranged to pass light received through said second distinct slide regions to said second light responsive means.

8. A positioning system in accordance with claim 7 wherein each of said means positioned between said slide and said light responsive means bears light transmission characteristics equivalent to a corresponding one of said distinct slide regions.

9. A positioning system in accordance with claim 8 wherein each of said distinct regions comprises polarized material having a distinct direction of polarization.

10. A positioning system in accordance with claim 8 wherein each of said distinct regions comprises filter material capable of transmitting light contained in a distinct wavelength band.

11. A poistioning system comprising an electron discharge device having a luminescent surface, means for projecting an electron beam against said surface, means for deflecting said beam and means for correcting the deflection of said beam, said correcting means including a positioning slide fixed in space and comprising a first distinctive region arranged in separated elongated bands and a second distinctive region arranged in elongated bands adjacent and intermediate said bands of said first distinctive region, means for focusing light from said surface on a discrete area of said slide, first and second light responsive means for generating electrical signals in response to light transmitted thereto from said surface through said positioning slide, means positioned between said positioning slide and said first light responsive means and arranged to pass light only from said first slide region to said first light responsive means, other means positioned between said positioning slide and said second light responsive means and arranged to pass light only from said second slide region to said second light responsive means and comparison means for applying correction signals to said deflection means dependent on the comparison of electrical signals generated by said light responsive means to position said beam so that resultant light is focused on said poistioning slide substantially on an intersection between a band of said first region and an adjacent band of said second distinctive region.

12. A positioning system in accordance with claim 11 and further comprising a second positioning slide fixed in space and having elongated bands of distinct regions corresponding to and angularly displaced from said bands in said first positioning slide, means for focusing light from said surface on said second slide, third and fourth light responsive means for generating electrical signals in response to light transmitted thereto from said surface through said second positioning slide, means positioned between said second positioning slide and said third light responsive means and arranged to pass light only from a first one of said second slide regions to said third light responsive means, other means positioned between said second slide and said fourth light responsive means and arranged to pass light only from a second one of said second slide regions to said fourth light responsive means and comparison means for applying correction signals to said deflection means dependent on the comparison of electrical signals generated by said third and fourth light responsive means to position said beam so that resultant light is focused so as to impinge said second slide substantially on an intersection between adjacent bands of said distinct regions.

References Cited in the file of this patent
UNITED STATES PATENTS

| | | |
|---|---|---|
| 2,016,036 | FitzGerald | Oct. 1, 1935 |
| 2,455,532 | Sustein | Dec. 7, 1948 |

FOREIGN PATENTS

| | | |
|---|---|---|
| 681,511 | Great Britain | Oct. 22, 1952 |